United States Patent [19]

Rahman et al.

[11] Patent Number: 4,694,357
[45] Date of Patent: Sep. 15, 1987

[54] APPARATUS AND METHOD FOR VIDEO SIGNAL PROCESSING

[75] Inventors: Altaf Rahman, Stamford; Vincent J. Navikas, Milford, both of Conn.

[73] Assignee: Thomson-CSF Broadcast, Inc., Stamford, Conn.

[21] Appl. No.: 726,409

[22] Filed: Apr. 24, 1985

[51] Int. Cl.$^4$ ............................................. H04N 5/92
[52] U.S. Cl. .................................... 360/9.1; 360/33.1; 360/35.1; 360/32; 358/335; 358/135
[58] Field of Search ....................... 360/33.1, 35.1, 32, 360/9.1, 11.1; 358/335, 136, 141, 135, 133, 261

[56] References Cited

U.S. PATENT DOCUMENTS

| | | | |
|---|---|---|---|
| 3,603,725 | 9/1971 | Cutler | 358/136 |
| 4,125,873 | 11/1978 | Chesarek | 364/900 |
| 4,148,070 | 4/1979 | Taylor | 358/141 |
| 4,360,840 | 11/1982 | Wulfrum et al. | 358/261 |
| 4,395,738 | 7/1983 | Hedlund | 360/9.1 |
| 4,403,250 | 9/1983 | Kellar | 358/335 |
| 4,441,208 | 4/1984 | Iida | 382/56 |
| 4,442,545 | 4/1984 | Reitmeier et al. | 382/56 |

Primary Examiner—Alan Faber
Attorney, Agent, or Firm—Martin M. Novack

[57] ABSTRACT

An apparatus and method are disclosed for encoding, storing, and reading out frames of video signal, such as a television signal. Fast access to encoded frames on a disk is achieved using a technique which employs tag bits to control the storage and decoding of the video.

16 Claims, 5 Drawing Figures

| PHASE | FRAME STORE BEING WRITTEN INTO | FRAME STORE BEING READ OUT OF | TAG BIT CHANNEL BEING WRITTEN INTO | TAG BIT CHANNEL BEING USED FOR READOUT | TAG BIT CHANNEL BEING CLEARED |
|---|---|---|---|---|---|
| 1 | A | B | A-1 | B-1 | B-2 |
| 2 | B | A | B-2 | A-1 | A-2 |
| 3 | A | B | A-2 | B-2 | B-1 |
| 4 | B | A | B-1 | A-2 | A-1 |

Fig. 2

APPARATUS AND METHOD FOR VIDEO SIGNAL PROCESSING

BACKGROUND OF THE INVENTION

This invention relates to storage and retrieval of video information and, more particularly, to an apparatus and method which permits an image to be efficiently stored in an encoded fashion, and retrieved more quickly for display, recording and/or broadcast.

In various applications it is desirable to have frames of video information available for virtually instantaneous presentation upon command of an operator. For example, in the television broadcast field, it is advantageous to have a "library" of stored frames which represent relatively high quality pictures that might be used during a program; for example, a picture of an entertainment, political, or sports figure, or a table of statistics, or a graph or chart, etc. Pictures of this type can be generated beforehand, and stored on a bulk storage medium, such as a magnetic disk. In one method, a television camera is utilized to generate an analog video signal, which is then digitized and stored on a disk. Alternatively, a character generator can generate the video signal in analog form, and it can be converted to digital form, or it may be generated directly in digital form, and stored on disk. When it is desired to use the stored frame of video information, it can be read from the disk and stored in a frame buffer; i.e., an addressable block of random access memory which stores digital pixel values (color and/or luminance values) at addresses corresponding to each respective pixel position of a video frame. A video signal can then be scanned out of the frame buffer for real time presentation of live video. Of course, the output of the frame buffer can be first converted to an analog video signal, as desired.

A substantial drawback of the described technique is that in order to have almost immediate presentation of a selected image from the library of pictures on the disk, one must generally provide a high-speed high-density disk or other storage medium that is very expensive. When using lower cost disks, the operation of reading a frame of video from disk to frame buffer will be relatively slow.

It is among the objects of the present invention to provide an apparatus and method which permits fast access to stored frames of video without requiring expensive high-speed bulk storage media. It is also among the objects of the present invention to provide a technique which permits efficient encoding of video signal such that less storage room is required on a bulk storage medium; this being done in conjunction with an encoding and processing technique that is not unduly complex or expensive.

SUMMARY OF THE INVENTION

The present invention is directed to an apparatus and method for encoding, storing, and reading out frames of video signal, such as a television signal.

In accordance with the apparatus of the invention, a block of addressable random access memory is provided, the memory block being capable of storing a frame of video pixel values at respective pixel addresses and a pair of tag bits associated with each pixel address. A storage medium, for example a magnetic disk, is provided. Means are provided for encoding a frame of video signal and storing the encoded information in the storage medium, the encoded information including a pixel position indication and an associated pixel value for positions in a frame where the pixel value changes from its value at the adjacent pixel position. Means are provided for writing an encoded frame from the storage medium into the memory block, the pixel values associated with respective pixel positions of the encoded frame being written into corresponding pixel addresses of the memory block. Means are provided for setting one of the tag bits associated with each pixel address at which a pixel value is being stored in the memory block. Means are provided for subsequently reading out sequentially the encoded information in the memory block, and for simultaneously resetting the other of the tag bits associated with each pixel address. Means responsive to said ones of said tag bits are provided for decoding the pixel values read out of the memory block to provide a decoded output frame having a decoded pixel value at each pixel position of the decoded output frame. Finally, means are provided for reversing the roles of said tag bits during the writing of the next encoded frame into the memory block, the reading of the next frame out of the memory block, and the decoding; whereby said others of said tag bits are used for said writing, reading, and decoding, and said ones of said tag bits are reset.

In a preferred embodiment of the invention, a second block of addressable random access memory is provided, the second memory block also being capable of storing a frame of video pixel values at respective pixel addresses and a pair of tag bits associated with each pixel address. In this embodiment, the second memory block is operative in the same manner as the first-mentioned memory block, and operates such that an encoded frame can be written into said memory block from the storage medium while encoded information is being sequentially read out of the first-mentioned memory block, and encoded information can be sequentially read out of the second memory block while an encoded frame is being written into the first-mentioned memory block from the storage medium. In this manner, and as will be described further hereinbelow, simultaneous reading into and writing out of the system can be performed, under control of a four phase tag bit cycle, so that frames of video can be quickly and efficiently presented for display, recording and/or broadcast.

Further features and advantages of the invention will become more readily apparent from the following detailed description when taken in conjunction with the accompanying drawings.

BRIEF DESCRIPTION OF THE DRAWINGS

FIG. 2 is a table which shows various phases of operation of the invention.

DESCRIPTION OF THE PREFERRED EMBODIMENT

Figure 1:
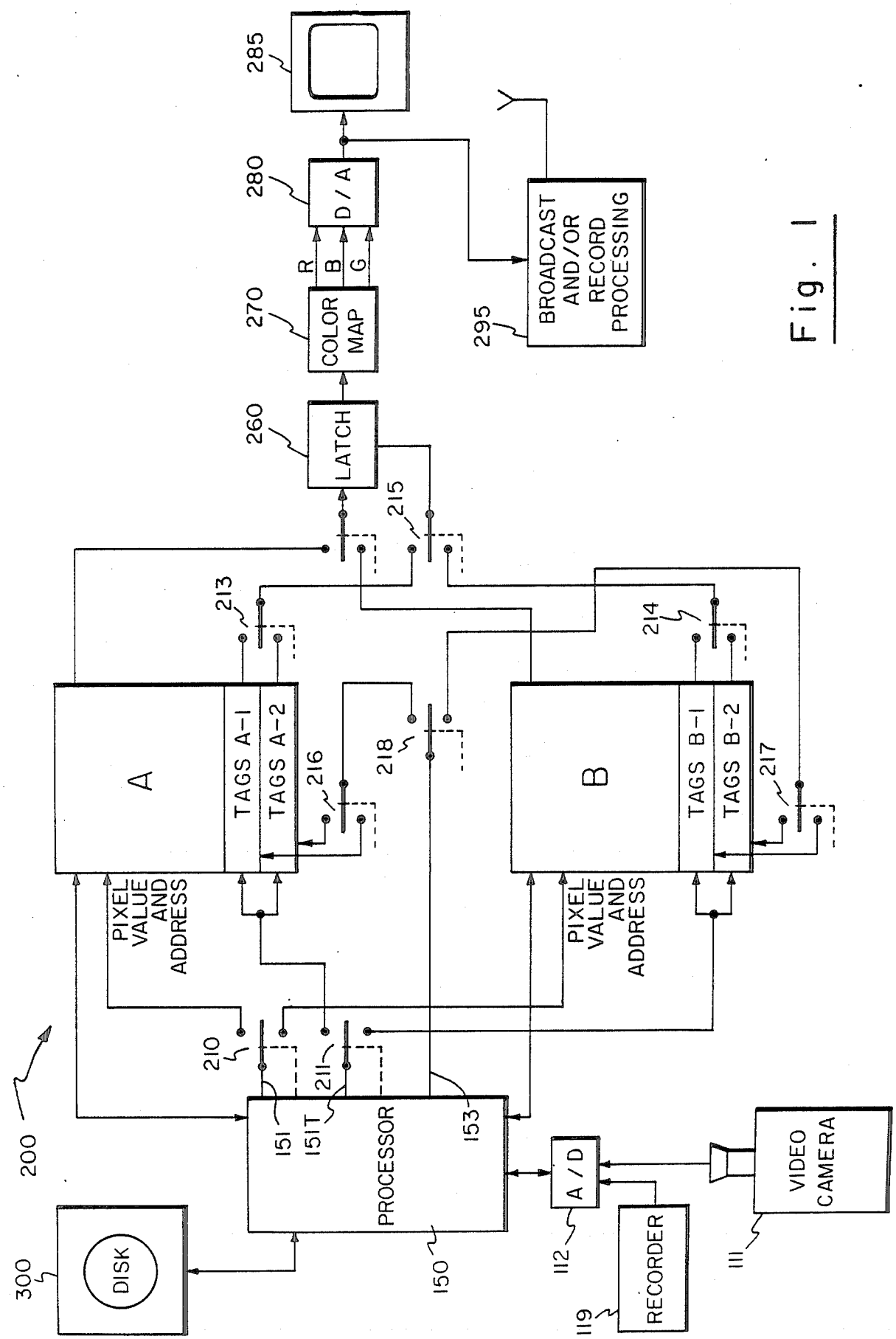
FIG. 1 is a block diagram, partially in schematic form, of an apparatus which includes an embodiment of the invention, and which can be used to practice the method of the invention.

Referring to FIG. 1, there is shown a block diagram of an apparatus which includes an embodiment of the invention, and which can be used to practice the method of the invention. A television camera 111 is provided, and an output of the television camera is coupled to an analog-to-digital converter 112, which is operative to convert the television signal into digital form. The present invention has application to both monochrome and color video, but is particularly advantageous for use in conjunction with a color video system. The converted video can be in any desired suitable form which represents, for example, a luminance value and/or color component values. The present invention is not concerned, per se, with the type of component values utilized. The luminance and/or color component values are sometimes referred to as pixel values or index values, and the term "pixel value" will be utilized herein to represent the luminance, color component, or other coded value at a particular elemental position or "pixel position" of a video frame. The term "frame", as used herein, is intended to mean one or more video fields, as appropriate. In the present embodiment, the output of analog-to-digital converter 112 comprises 24 binary bits, there being 8 bits to represent each of three color components R, B and G.

The output of analog-to-digital converter 112 is coupled, under control of a processor 150 to a digital video frame store and control system 200, and to a bulk video storage medium 300, such as a magnetic disk or other suitable digital recording device. The processor 150 may comprise, for example, a model 68000 microprocessor manufactured by Motorola Corp., along with suitable clock, memory, and peripherals as are conventionally provided, or any other suitable general or special purpose processor. The processor 150, and its associated circuitry, have input and output ports through which the processor can issue and receive signals and control signals and/or couple signals as between different components of the system.

The video frame store and control system 200 includes a pair of random access memory blocks labeled A and B, each memory block being capable of storing a frame of color video information, and certain other information, to be described. It will be understood that the memory blocks A and B can, if desired, be part of one large memory, or can alternatively be combinations of various smaller memories. Each of the memories A and B includes an address location for each pixel position of a frame. The addresses of the pixel positions can be conventionally represented as (x,y) addresses, with the y value representing the line number (e.g. video scan line number), and the x value representing the element or pixel number on a line. In the present embodiment, the A and B memories each have 13 bits associated with each pixel address; i.e., 11 bits which represent the pixel value, and 2 bits which are used as "tag bits", to be described. The 2 tag bits at each pixel location in the A memory are respectively designated as tag bits A-1 and A-2, while the two tag bits associated with each pixel address in the B memory are respectively designated as tag bits B-1 and B-2. In the diagram of FIG. 1, the tag bits are illustrated as being in respective tag bit "channels" A-1, A-2, B-1, and B-2, for ease of understanding the manner in which the tag bits are used, although it will be understood that each pair of tag bits may be physically located in conjunction with the pixel value bits associated with its pixel address.

In the diagram of FIG. 1, control signals are illustrated as being coupled between the processor 150 and each of the memories A and B. [It will be understood that suitable clock and synchronizing signals can be provided to the various components of the system, as is conventionally done in the art.] The 13 bit pixel values, and appropriate addresses, are indicated as being output from processor 150 on a line 151 which is coupled, via switch 210, to one or the other of the memories A or B, at an address location which is also designated by the processor 150. Another line, 151T, output from processor 150, carries a signal which is utilized selectively to set the tag bits at the particular address location (i.e., a portion of the same address location into which the pixel value is being entered via switch 210), in either the tag bit channels of memory A or the tag bit channels of memory B. The switches 210 and 211, as well as the other switches shown in FIG. 1, are under control of processor 150, as represented by the dashed lines through the switches.

Pixel values output from memories A and B are respective inputs to a switch 212, the output of which is coupled to the input of a latch 260. The outputs from the respective tag bits A-1 and A-2 of memory A are coupled to respective inputs of a switch 213, the output of which is one input to another switch 215. Similarly, the respective outputs of the tag bits B-1 and B-2 of memory B are respective inputs to a switch 214, the output of which is coupled to the other input of switch 215. Also, a reset signal (at a logic "0" level) is coupled to the input of a switch 218, the outputs of which are respectively coupled to the inputs of switches 216 and 217. The outputs of switch 216 are, in turn, coupled to the addressed tag bits A-1 and A-2. Similarly, the outputs of switch 217 are coupled to the addressed tag bits B-1 and B-2. The output of latch 260 is coupled to a color map 270 which may typically comprise a ROM or a PROM, and which is operative to convert the pixel values read out of latch 260 to R, B and G values, in accordance with a predetermined tabular relationship. Color maps are well known in the art, and are not, per se, a feature of the present invention. The color map may operate, for example, to convert an 11 bit pixel value (or color index value) into a 24 bit output pixel value (8 bits each of R, G, B), as determined from a look-up table, which may be fixed or variable under control of an operator or the processor 150. The outputs of color map 270 can be converted to analog form by digital-to-analog converter 280, and then displayed on a monitor 285. Typically, the output of color map 270 could also be coupled to a keyer or other processing circuitry and/or be further processed for display, broadcasting and/or recording, as represented at 290 and 295.

To facilitate understanding of operation of the system of FIG. 1, consider first the nature of an encoded video signal which is to be stored in one of the video frame stores, for example memory A. As will be described further hereinbelow, the video is stored in memory A in transition-encoded form; i.e., only pixel addresses at which the pixel value has changed with respect to the pixel value at the previous adjacent pixel position will contain useful information, and those pixel positions (addresses) at which there has not been a transition will not contain information that is ultimately used in reading out the video frame from the memory. For video frames which have substantial areas with the same pixel value (e.g., the same color), this means that the frame can be represented by a much smaller number of pixel values as compared to a conventionally represented frame. Further, and as will become understood, it is not necessary to erase the pixel values from those pixel addresses in the memory that are not being used to represent the currently stored video frame; instead, the tag bits are utilized to identify those pixel addresses where transitions occur. When the frame is later read out, one channel of tag bits (i.e., the one not being used for representing the frame of video currently being read out) can be reset (or "erased"), so that it is cleared and ready for use when the next frame of transition-encoded video is written into the memory. For example, assume that the tag bits A-1 of memory A have previously been erased, and contain all "0"'s. Now, as the transition-encoded video frame is written into memory A (using, for example, the routine described hereinbelow in conjunction with FIG. 4), under control of processor 150, the tag bit at each pixel address at which a transition occurs will be set to "1"(via line 151T and switch 211) as the pixel value at the transition is written into the associated pixel position (address) of memory A. [In actuality, the tag bits A-1 and A-2 can both be set to "1" during this operation, so there is no need to select channel A-1 or A-2 here. As will be seen, the A-2 channel will be cleared ("erased") as the current frame is read out of memory A, so it does not matter what is read into it during this pass. The same is true each time tag bits are written into a given channel.] When this writing operation is complete, only the pixel positions (addresses) at which transitions occur will have a tag bit of "1" at its A-1 tag bit position. The other 11 bits at each such address will contain the pixel value (e.g., color index) at the transition. During the reading out operation (which is described hereinbelow in conjunction with the routine of FIG. 5), the memory A (in this example) is sequentially interrogated, in raster scan fashion, and the pixel value at each pixel position (address) is coupled to latch 260, via switch 212. However, only those pixel positions (addresses) where the tag bit A-1 (in this example) have been set to "1" (i.e., the pixel positions at which transitions occur) will cause a latch 260 to be set (via switches 213 and 215). Also, during this operation, the reset signal on line 153 is being coupled successively to the tag bits A-2 (in this example) at each pixel position of the raster scan, via switch 218 and switch 216. In this manner, the tag bit "channel" A-2 is cleared or "erased" during the reading out of the memory A.

By employing the two memories A and B, it will be understood that, while one of the memories is being used to read out a stored video frame, another video frame can be written into the other memory. In accordance with a feature of the present invention, one tag bit channel is cleared as the other one is used, so the different tag bit channels are alternately employed for use in conjunction with successive stored frames of video in a particular memory (A or B). Since the memories A and B are also alternately employed for writing into and reading out of, there can be effectively a four phase cycle of operation, an example of which can be set forth as follows:

Phase I: A transition-encoded video frame is written into memory A, while writing the tag bits associated with transitions into the tag bit channel A-1. During this time, a transition-encoded video frame in memory B can be read out (e.g., for broadcast, recording, and/or display), using the tag bits B-1 (which had been stored in conjunction with the frame stored in memory B) to control the latch 260 during readout. Also, during said readout, the tag bits B-2 are set to "0" (erased). A summary of these phase I operations is shown in the first row of the table of FIG. 2.

Phase II: A transition-encoded video frame is written into memory B, while writing the tag bits associated with transitions into the tag bit channel B-2. During this time, a transition-encoded video frame in memory A can be read out (e.g., for broadcast, recording, and/or display), using the tag bits A-1 (which had been stored in conjunction with the frame stored in memory A) to control the latch 260 during readout. Also, during said readout, the tag bits A-2 are set to "0" (erased). A summary of these phase II operations is shown in the second row of the table of FIG. 2.

Phase III: A transition-encoded video frame is written into memory A, while writing the tag bits associated with transitions into the tag bit channel A-2. During this time, a transition-encoded video frame in memory B can be read out (e.g., for broadcast, recording and/or display), using the tag bits B-2 (which had been stored in conjunction with the frame stored in memory B) to control the latch 260 during readout. Also, during said readout, the tag bits B-1 are set to "0" (erased). A summary of these phase III operations is shown in the third row of the table of FIG. 3.

Phase IV: A transition-encoded video frame is written into memory B, while writing the tag bits associated with transitions into the tag bit channel B-1. During this time, a transition-encoded video frame in memory A can be read out (e.g., for broadcast and/or display), using the tag bits A-2 (which had been stored in conjunction with the frame stored in memory A) to control the latch 260 during readout. Also, during said readout, the tag bits A-1 are set to "0" (erased). A summary of these phase IV operations is shown in the fourth row of the table of FIG. 2.

To describe an example of a procedure by which a frame of video from camera 111, or from a video recorder 119, is stored on disc 300, assume that a frame of video from one of these sources is initially stored in the frame store A in conventional fashion; i.e., with a digital pixel value at each pixel position (or address). The frame of video stored in frame store A is to be stored on disk 300 in encoded form, under control of processor 150. As described above, in the present embodiment, only the pixel addresses and associated pixel values of transitions in the frame are stored on the disk 300. In this manner, the storage of frames which have substantial areas with the same pixel values (e.g., a colored background region in a frame) require much less storage region on the disk.

Figure 3:
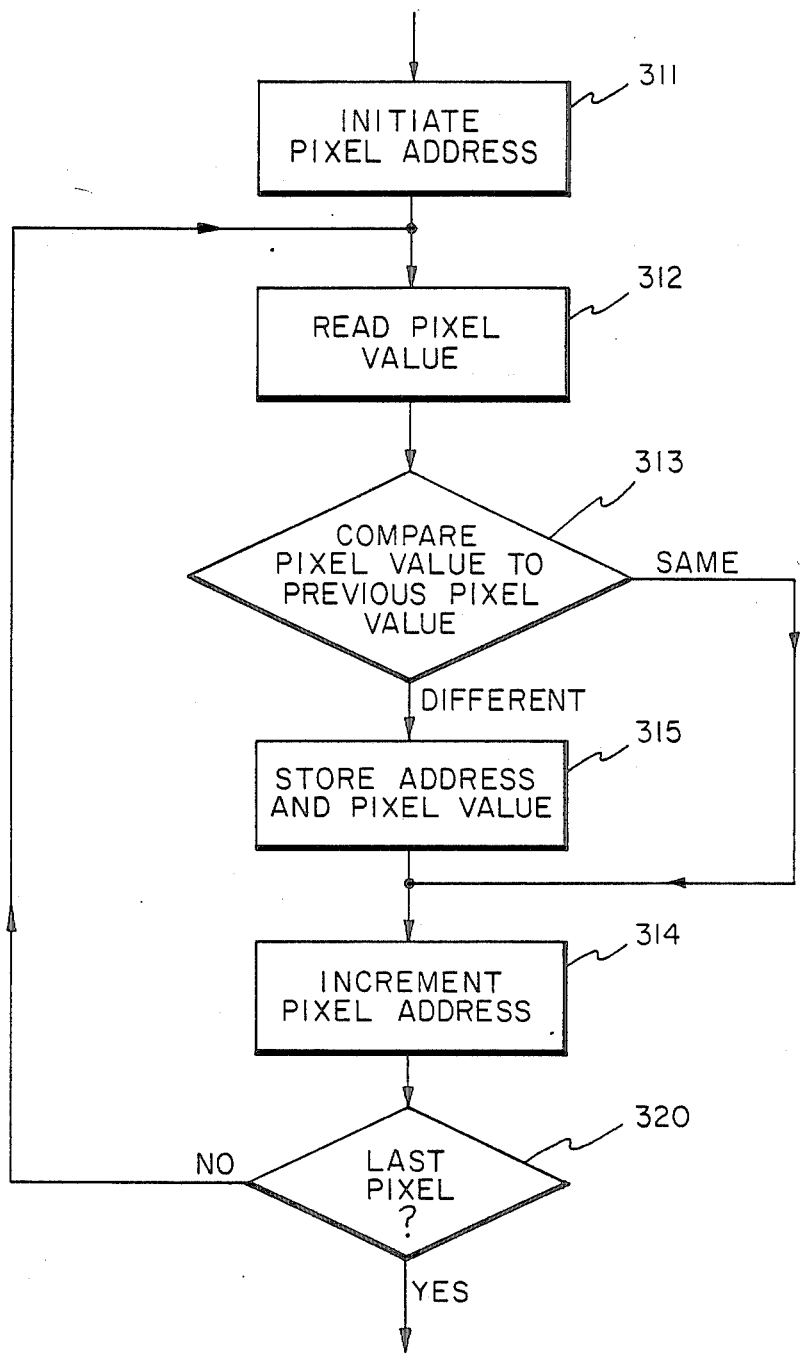
FIG. 3 is a flow diagram of a routine for controlling the storage of transition-encoded video frames on a storage medium.

An example of a routine for controlling the processor 150 to implement the encoding and storage is shown in FIG. 3. The block 311 represents the initializing of the pixel address, which is typically an (x,y) representation of a scanline number and an element number, to the first pixel address of the frame (e.g., pixel (1,1)) in the upper lefthand corner of the frame. The block 312 is then entered, this block representing the reading out from the frame store of the pixel value at the current pixel address. The pixel value read out of frame store A is examined to determine if it is the same as the pixel value at the previous pixel position, as represented by the diamond 313. [For the first pixel position of the frame, the pixel value will always be considered to have changed from a previous value.] If not, the block 314 is entered, this block representing the incrementing of the pixel address to the next pixel position of the frame. If, however, there has been a change in the read out pixel value, the block 315 is entered, so that the address and the associated pixel value can be stored on the disk. The block 314 is then also entered, via block 315, and the pixel address is incremented. Inquiry is then made as to whether or not the last pixel position (or address) of the frame has been reached, as represented by diamond 320. If not, the block 312 is reentered and the routine continues as the addresses and pixel values at each transition of a frame are stored sequentially on the disk 300. The inquiry of diamond 320 is then answered in the affirmative, and the routine can be exited.

In the present embodiment, a transition is not deemed to occur at each scanline as one ends a scanline and begins a new one, although this convention can be modified as desired. It will also be understood that the encoded addresses and pixel values can be designed to further save storage space, such as by storing only the element (x) index of an address for transitions on the same scanline as a previous transition on the scanline. Also, for example, a new pixel value at a transition can be represented by storing only the least significant bits of the new pixel value if the most significant bits of said pixel value have not changed with respect to the previous transition pixel position. Other variations on the encoding scheme can also be employed, if desired. It is noted that the described operation of encoding and storing the video frame can generally be performed during a preparation mode at a relatively slow rate.

The above-described phases of operation, where encoded video is written into one of the memories A or B, and read out of the other of the memories A or B, are controlled by the processor 150, either automatically, or as prompted by an operator or external control equipment. Next will be described the routines by which the processor can control the writing into a memory (A or B) of an encoded video signal, the reading from a memory (A or B), and the decoding of a read out video signal.

Figure 4:
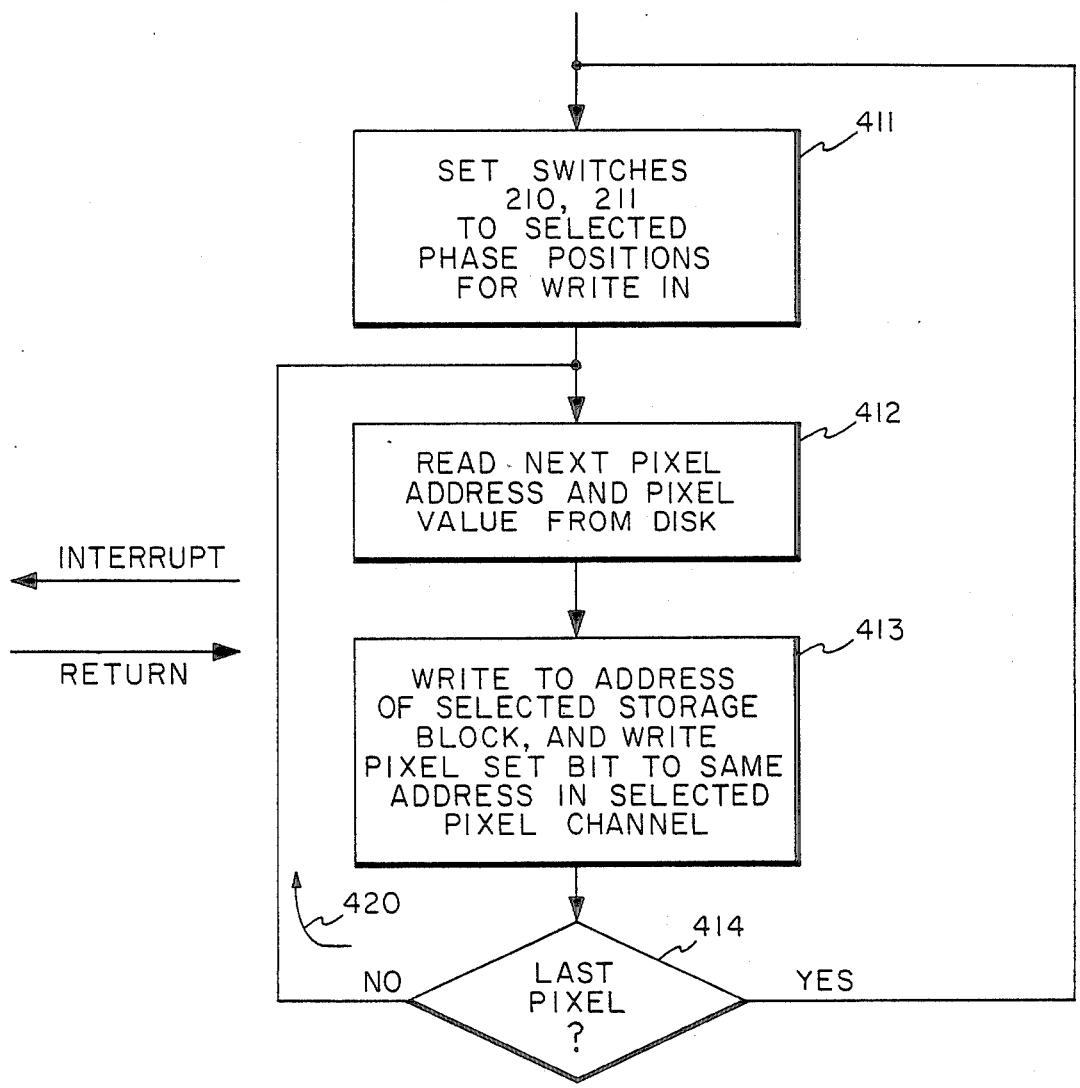
FIG. 4 is a flow diagram of a routine for writing frames of transition-encoded video from a storage medium into the frame store memory of the invention, in conjunction with setting the tag bits of the invention.

Referring to FIG. 4, there is shown a flow diagram of the routine for writing a frame of transition-encoded video from, for example, disk 300 (or other suitable storage medium), into memory A. The block 411 represents the setting of switches of 210 and 211 (FIG. 1) to appropriate positions for the write-in for the particular phase of operation. For example, for phase I (FIG. 2), these switches will be set to input to memory A. The block 412 is then entered, this block representing the reading of the next pixel address (which will be for the next transition) and the associated pixel value from disk 300. Next, the block 413 represents the writing of the just-read pixel value into the just-read address in the memory A (via switch 210), and the writing of a pixel set bit ("1") into the pixel bit A-1 (for this example, for phase I operation) at that same address. Inquiry is then made (diamond 414) as to whether or not the last transition-encoded pixel address and value for the frame has been reached. If not, the block 412 is reentered, and the loop 420 continues until the entire transition-encoded frame has been written into memory A. The arrows to the left of the flow diagram indicate that this routine may be interrupted for servicing of another routine having priority and also controlled by processor 150, and returned to for continuation during inactive periods of the routine having priority. In particular, the read-out and decoding routine of FIG. 5 will have priority (so that there will be continuous video output), so when a frame of video is being read out of the other memory, the write-in routine of FIG. 4 will operate during waiting time between sequential read-out of pixels. Alternatively, special purpose hardware could be provided, if desired, to implement the reading of encoded frames of video from disk to the frame stores A and B.

Figure 5:
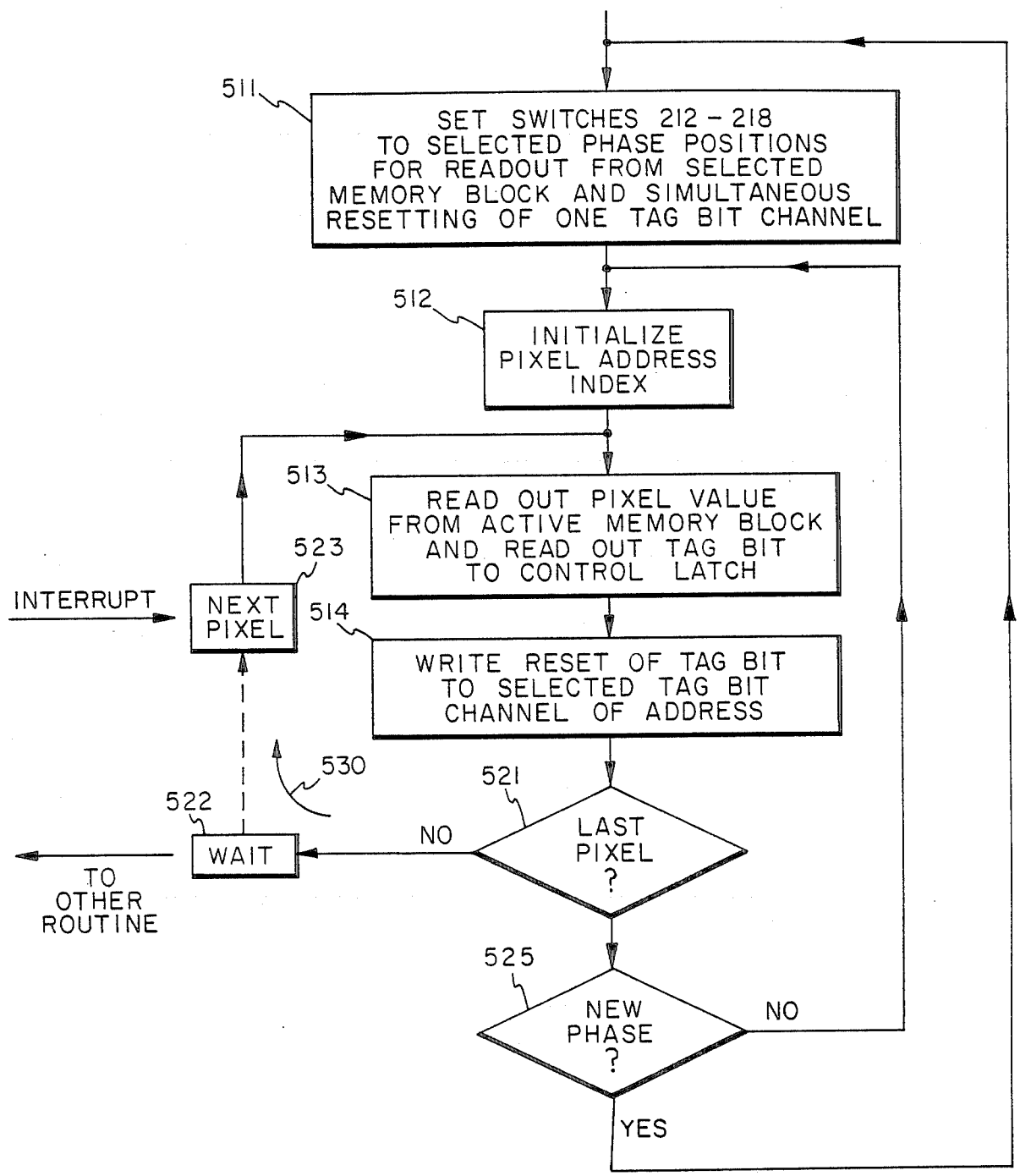
FIG. 5 is a flow diagram of a routine for controlling the reading out and decoding of video frames in accordance with an embodiment of the invention.

FIG. 5 shows a routine for controlling the reading out and decoding of a stored frame (e.g., for broadcast, display and/or display) from one of the memories (B, in this example). As above stated, it is assumed in this example that the system is in a Phase I mode; i.e., with a write-in to memory A (as just previously described), and a read-out from memory B, using tag bits B-1. The block 511 represents the setting of switches 212–218 (FIG. 1) to the selected positions for the present phase; i.e., for appropriate reading-out of the selected memory (B) using the appropriate tag bits (B-1), and resetting the appropriate tag bits (B-2), in this example. This means that switches 212 and 215 are set to the "B" position, switch 213 does not matter (for this case), switch 214 is set to the B-1 position, switch 218 is set to the "B" position, switch 216 does not matter (for this case), and switch 217 is set to the B-2 position. The pixel address index is then initialized to the first pixel address of the frame [for example, (1,1)], as represented by the block 512. The pixel value at the current pixel address is then read out, and the tag bit (B-1 in this case) at the current address is also read out, to control the latch 260 (block 513). The latch will be updated when the tag bit is a "1". Also, as represented by the block 514, a reset signal is issued to reset (to a "0") the tag bits of the tag bit channel not presently being used (B-2 in this case), via switches 218 and 217. Inquiry is then made (diamond 521) as to whether or not the last pixel of the frame has been reached. If not, the next clock signal interrupt is awaited (the clock being conventionally synchronized with the television raster scan), as represented by block 522. During any wait time, other routines, particularly that of FIG. 4, can be attended until the next clock interrupt, whereupon the pixel index is incremented (block 523), block 513 is reentered, and the loop 530 is continued until the frame has been read out and decoded. When the last pixel is reached, the answer to the inquiry of diamond 521 will be in the affirmative, and this pass through the routine will be complete. Determination can then be made (diamond 525) as to whether or not a new phase is to be implemented. If not, block 512 is reentered and the frame is read out again. If so, however, block 511 is entered to initialize operation for the current phase.

The invention has been described with reference to a particular preferred embodiment, but variations within the spirit and scope of the invention will occur to those skilled in the art. For example, special purpose hardware can be provided, if desired, for any of the functions described herein, such as reading encoded frames from disk to the frame stores (as noted above), resetting of tag bits, etc.

What is claimed is:

1. Apparatus for encoding, storing, reading out, and decoding frames of video signal, comprising:
   a memory block, said memory block being capable of storing a frame of video pixel values at respective pixel addresses and a pair of tag bits associated with each pixel address;

a storage medium;

means for encoding a frame of video signal and storing the encoded information in said storage medium, the encoded information including a pixel position indication and an associated pixel value for positions in a frame where said pixel value changes from the pixel value at the adjacent pixel position;

means for writing an encoded frame from said storage medium into said memory block the pixel values associated with respective pixel positions of the encoded frame being written into corresponding pixel addresses of said memory block;

means for setting one of the tag bits associated with each pixel address at which a pixel value is being stored in said memory block;

means for subsequently reading out sequentially the encoded information in said memory block, and for simultaneously resetting the other of the tag bits associated with each pixel address;

means responsive to said ones of said tag bits for decoding the pixel values read out of said memory to provide a decoded output frame having a decoded pixel value at each pixel position of said decoded output frame; and means for reversing the roles of said ones of said tag bits and said other tag bits during the writing of the next encoded frame into said memory block, the reading of said next frame out of said memory block and said decoding; whereby said others of said tag bits are used for said writing, reading and decoding, and said ones of said tag bits are reset.

2. Apparatus as defined by claim 1, further comprising:

a second memory block, said second memory block being capable of storing a frame of video pixel values at respective pixel addresses and a pair of tag bits associated with each pixel address;

and wherein said second memory block is operative in the same manner as said first-mentioned memory block, such that an encoded frame can be written into said memory block from said storage medium while encoded information is being sequentially read out of said first-mentioned memory block, and encoded information can be sequentially read out of said second memory block while an encoded frame is being written into said first-mentioned memory block.

3. Apparatus as defined by claim 2, wherein said decoding means comprises a latch which is set under control of the tag bit associated with a pixel address being read out, and the latched pixel value is also associated with the address of the pixel position being read out.

4. Apparatus as defined by claim 3, wherein said first-mentioned memory block comprises addressable random access memory.

5. Apparatus as defined by claim 4, wherein said second memory block comprises addressable random access memory.

6. Apparatus as defined by claim 4, wherein said storage medium is a bulk storage medium.

7. Apparatus as defined by claim 5, wherein said storage medium is a bulk storage medium.

8. Apparatus as defined by claim 2, wherein said first-mentioned memory block comprises addressable random access memory.

9. Apparatus as defined by claim 8, wherein said second memory block comprises addressable random access memory.

10. Apparatus as defined by claim 2, wherein said storage medium is a bulk storage medium.

11. Apparatus as defined by claim 10, wherein said bulk storage medium is a magnetic disk.

12. Apparatus as defined by claim 1, wherein said decoding means comprises a latch which is set under control of the tag bit associated with a pixel address being read out, and the latched pixel value is also associated with the address of the pixel position being read out.

13. Apparatus as defined by claim 1, wherein said first-mentioned memory block comprises addressable random access memory.

14. Apparatus as defined by claim 1, wherein said storage medium is a bulk storage medium.

15. Apparatus as defined by claim 14, wherein said bulk storage medium is a magnetic disk.

16. A method for encoding, storing, reading out, and decoding frames of video signal, comprising the steps of:

encoding a frame of video signal and storing the encoded information in a storage medium, the encoded information including a pixel position indication and an associated pixel value for positions in a frame where said pixel value changes from the pixel value at the adjacent pixel position;

writing an encloded frame from the storage medium into a random access memory block, the pixel values associated with respective pixel positions of the encoded frame being written into corresponding pixel addresses of the random access memory block;

setting one of two tag bits associated with each pixel address at which a pixel value is being stored in said random access memory block;

subsequently reading out sequentially the encoded information in said random access memory block, and simultaneously resetting the other of the two tag bits associated with each pixel address;

decoding, under control of said ones of said tag bits, the pixel values read out of said memory to provide a decoded output frame having a decoded pixel value at each pixel position of said decoded output frame; and reversing the roles of said ones of said tag bits and said other tag bits during the writing of the next encoded frame into the random access memory block, the reading of said next frame out of the random access memory block and the decoding; whereby said others of said tag bits are used for said writing, reading and decoding, and said ones of said tag bits are reset.

* * * * *